United States Patent [19]

Takeda et al.

[11] Patent Number: 5,760,342
[45] Date of Patent: Jun. 2, 1998

[54] METHOD, APPARATUS AND SYSTEM FOR COMBINATIONAL WEIGHING BY RANKS

[75] Inventors: Masahiro Takeda, Shiga; Kiyokazu Shibahara, Hiroshima, both of Japan

[73] Assignee: Ishida Co., Ltd., Kyoto, Japan

[21] Appl. No.: 645,711

[22] Filed: May 14, 1996

[30] Foreign Application Priority Data

May 16, 1995 [JP] Japan ..................... 7-142726

[51] Int. Cl.⁶ .............. G01G 19/22; G01G 13/00; B07C 5/16
[52] U.S. Cl. ............ 177/25.18; 209/592; 177/52; 177/50
[58] Field of Search ............... 177/25.18, 50, 177/60, 59, 114, 116, 52; 209/592, 593, 596

[56] References Cited

U.S. PATENT DOCUMENTS

| | | | |
|---|---|---|---|
| 4,442,910 | 4/1984 | Mikami | 177/25.18 |
| 4,901,807 | 2/1990 | Muskat et al. | 177/25.18 |
| 5,246,118 | 9/1993 | Mosher | 209/592 |
| 5,258,580 | 11/1993 | Bergholt | 177/25.18 |
| 5,270,495 | 12/1993 | Mosher et al. | 177/25.18 |

*Primary Examiner*—Michael L. Gellner
*Assistant Examiner*—Randy W. Gibson
*Attorney, Agent, or Firm*—Keiichi Nishimura

[57] ABSTRACT

Combinational weighing by ranks is carried out by supplying articles of different weights to a plurality of weighing devices one at a time, measuring individual weights of these articles by the weighing devices, classifying the weighed articles individually into ranks according to their measured weights, and carrying out combinational weighing only on those of the weighed articles in a same rank. The combinational weighing is carried out preferentially on the articles in the most populated rank. An apparatus for this method not only includes a plurality of weighing devices, an article supplying units adapted to supply articles of different weights one at a time to these weighing devices, and a device for carrying out combinational calculations but also is adapted to classify weighed articles into ranks according to the measured weights. A system for combinational weighing includes such a combinational weighing apparatus, a packaging machine for receiving articles of a combination selected by the apparatus and packaging them to produce a packaged product, a sorter for sorting these packaged products by the ranks, and a control unit for controlling the operations of the packaging machine and the sorter according to the rank of the articles to be packaged together.

13 Claims, 4 Drawing Sheets

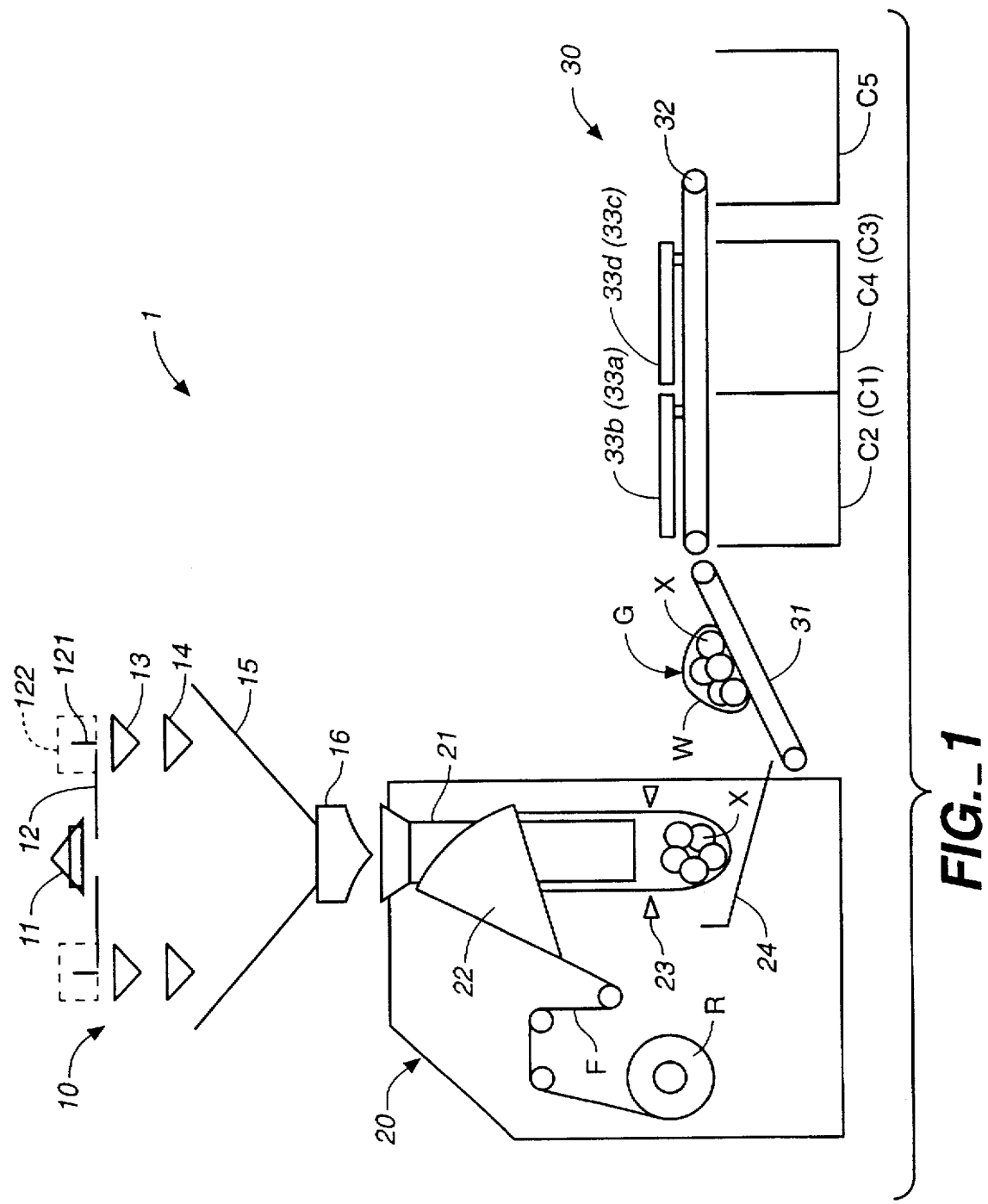
FIG._1

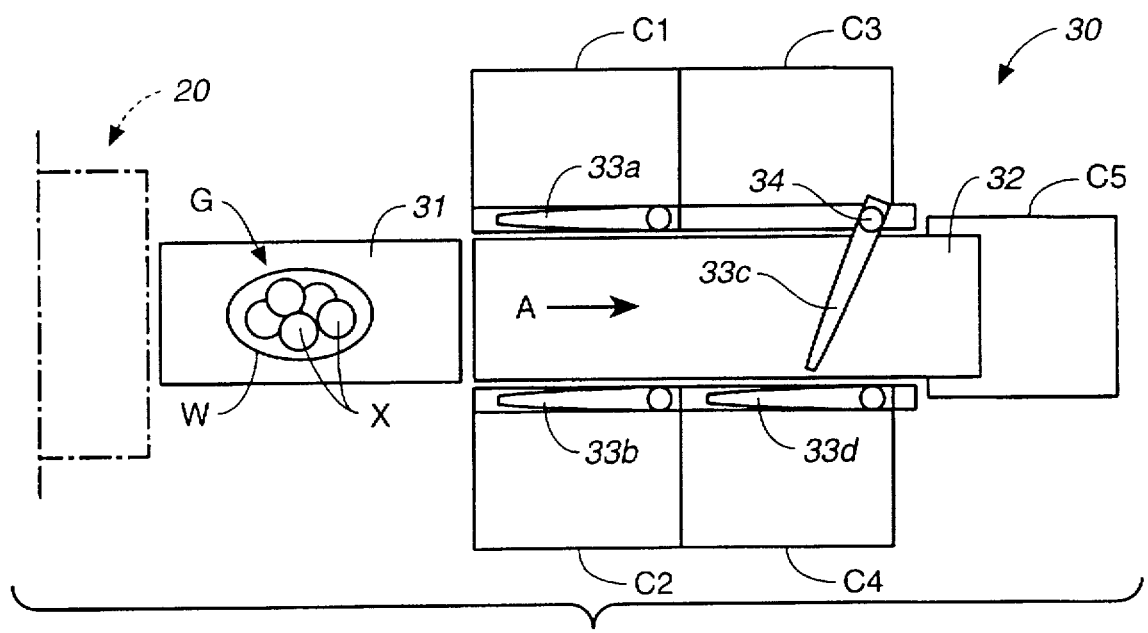
FIG._2
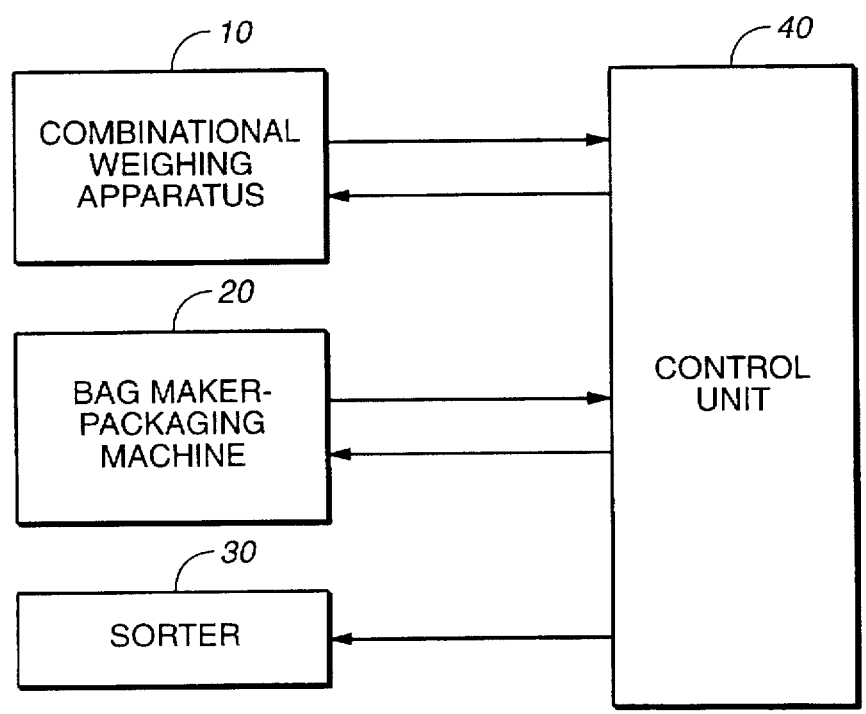
FIG._3

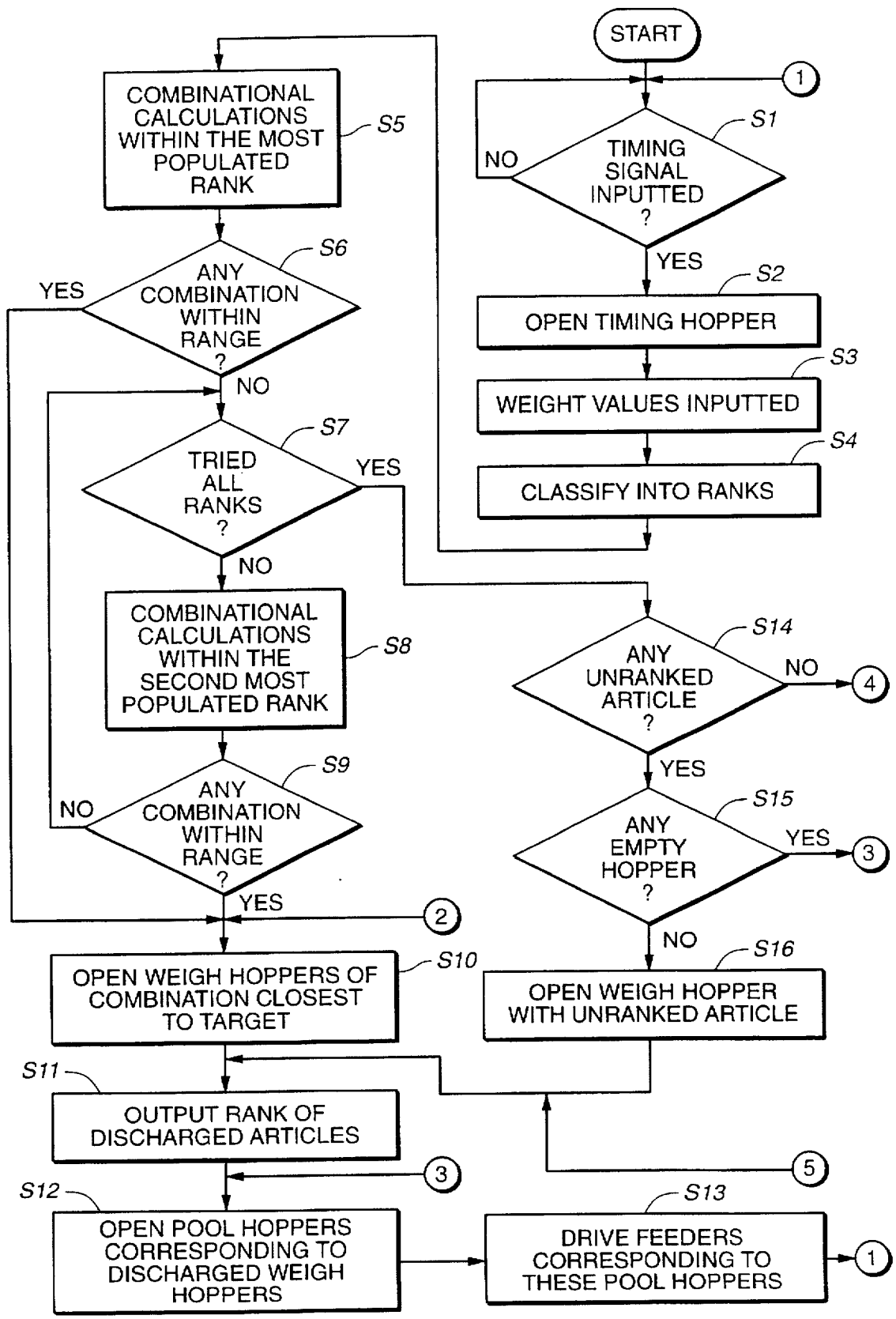
FIG._4

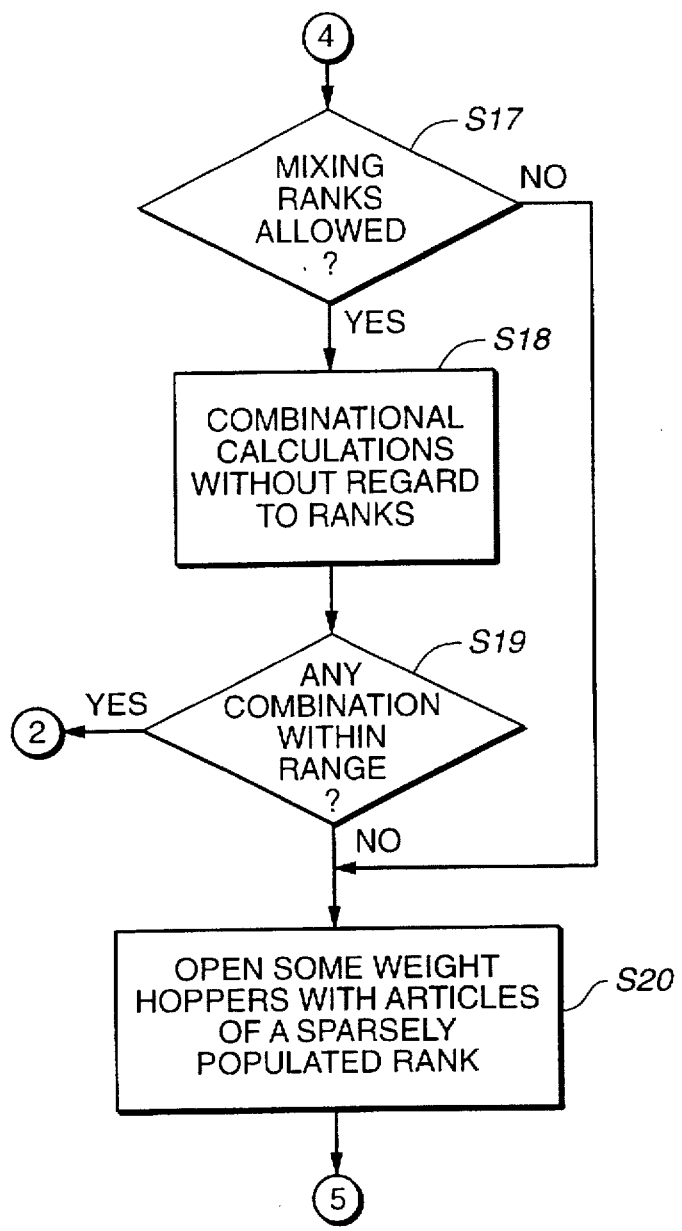
FIG._5

METHOD, APPARATUS AND SYSTEM FOR COMBINATIONAL WEIGHING BY RANKS

BACKGROUND OF THE INVENTION

This invention relates to a method of classifying articles into ranks by their weights and carrying out combinational weighing for each rank, as well as to an apparatus and a system therefor.

Combinational weighing is carried out by gathering a plurality of articles such as agricultural products having individually different weights for obtaining obtain a commercial product having a total weight within a specified range. To carry out combinational weighing, articles are supplied to a plurality of weighing units to obtain measured weight values and one of the combinations of these weight values is selected such that their sum will coincide with the target weight or come closest to it.

For some vegetable products such as green peppers, however, consumers often want the products to be already sorted out by weight, for example, into groups of small, medium and large pieces. In such a situation, the articles must be sorted into ranks before combinational weighing is carried out. Japanese Patent Publication Tokkai 2-55919 has disclosed an apparatus with capability for both sorting articles into ranks and carrying out combinational weighing, operable selectably either in the sorting mode or in the combinational weighing mode. An apparatus of this kind is certainly convenient because a single apparatus can be used both for sorting and for combinational weighing and also because there is no need to provide any extra means for transporting sorted articles to the weighing machine for carrying out combinational weighing. It is inconvenient, however, because the articles must be completely sorted by ranks before the mode of operation can be switched to carry out combinational weighing of the articles in each of the ranks. In other words, the articles which have been sorted by ranks must be temporarily stored somewhere until articles of that rank are supplied for combinational weighing. Not only does this require an extra space for temporary storage of the articles but the operation is inefficient because the articles must be supplied to the apparatus twice, firstly for sorting and secondly for combinational weighing.

SUMMARY OF THE INVENTION

It is therefore an object of this invention to provide an efficient method of combinational weighing of articles with different weights according to the ranks of their weights such that space for temporary storage of articles will not be required.

It is another object of this invention to provide a combinational weighing apparatus for using such a method.

It is still another object of this invention to provide a system including such a combinational weighing apparatus and a sorter.

By a method of combinational weighing according to this invention, with which the above and other objects can be accomplished, articles of different weights are supplied singly to each of a plurality of weighing devices, weighed thereby and classified into ranks according to the measured weight. Combinational weighing is carried out on articles within the same rank. The combinational weighing is carried out preferentially within a rank having more articles classified thereinto. A combinational weighing apparatus according to this invention may be characterized as comprising a plurality of weighing devices for measuring weights, article supplying means for supplying articles of different weights one at a time to these weighing devices, classifying means for classifying articles weighed by the weighing devices into ranks according to measured weights thereof, and means for carrying out combinational calculations on the measured weights of only those articles in a same rank, and preferably in a rank having more articles classified thereinto, and selecting a combination with total weight within a specified allowable range. A combinational weighing system according to this invention may be characterized as comprising not only such a combinational apparatus but also a packaging machine for packaging a selected combination of the articles discharged from the combinational weighing apparatus to produce packaged products, a sorter for sorting these packaged products according to the ranks, and a control unit for controlling operations of the packaging machine and the sorter according to the ranks determined by the classifying means.

With a method and apparatus according to this invention, classification of articles into ranks and combinational weighing can be carried out in a continuous series of operations since the combinational weighing is carried out immediately after the ranks are determined. Since the combinational weighing is carried out preferentially within a rank having more articles classified thereinto, there are more measured weights to be combined in the combinational calculations and hence it is more likely to obtain a product with the total weight within a specified allowable range. With a combinational weighing system according to this invention, operations of the packaging machine and the sorter are also controlled by the rank of the articles being packaged. Thus, the packaging machine can use different sizes of package-making material according to the rank and the sorter can sort them dependably.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a schematic structural diagram of a system for combinational weighing by ranks embodying this invention;

FIG. 2 is a plan view of the sorter of the system of FIG. 1;

FIG. 3 is a schematic block diagram of the control unit for the system of FIG. 1; and FIGS. 4 and 5 are a flow chart of the control carried out by the control unit for the system of FIG. 1.

DETAILED DESCRIPTION OF THE INVENTION

FIG. 1 shows a combinational weighing system 1 embodying this invention, characterized as comprising a combinational weighing apparatus 10, a bag maker-packaging machine 20 and a sorter 30.

Although shown only symbolically in FIG. 1, the combinational weighing apparatus 10 comprises a dispersion table 11 disposed at the center, sixteen radial feeders 12 disposed peripherally around the dispersion table 11 at equal intervals, sixteen pool hoppers 13 individually associated with the radial feeders 12, sixteen weigh hoppers 14 disposed directly below and individually associated with the pool hoppers 13, a collector chute 15 disposed below the weigh hoppers 14, and a timing hopper 16 disposed below the collector chute 15. Many articles (of various sizes) to be packaged in groups are adapted to be transported, say, by a basket conveyer (not shown) to the dispersion table 11, thereby distributed among the radial feeders 12 and thereby transported radially outward towards the pool hoppers 13. At the radially outward end of each of the radial feeders 12 is a gate 121. A control device 122 is provided to each gate 121 such that articles on the radial feeder 12 can pass through the gate 121 only one at a time, or such that there cannot normally be two or more of the articles in any of the pool hoppers 13 at any time. Such a control device may comprise a sensor for detecting the passage of each of such articles across the gate. Since gates and their control devices adapted to function in this manner are well known (as provided in Model CCW-EZ214 produced and sold by ISHIDA CO., LTD., the assignee of this invention), no example with any specific design will be disclosed herein.

The pool hoppers 13 are each for temporarily storing therein only one of these articles at any time and dropping this stored article into the weigh hopper 14 corresponding thereto and disposed immediately therebelow. The weigh hoppers 14 are each adapted to receive the article dropped from the corresponding pool hopper 13 and to measure its weight. The collector chute 15 is for receiving the articles dropped from selected ones of the weigh hoppers 14 thereabove and collecting them in the timing hopper 16 therebelow. The articles thus collected in the timing hopper 16 are discharged therefrom into the bag maker-packaging machine 20 disposed therebelow at a specified timing. As will be described more in detail below, the articles weighed in the weigh hoppers 14 are classified into specified ranks according to their measured weight values, and combinational calculations are carried out only regarding articles within the same rank. Thus, only those articles within the same rank and selected by the combinational calculations are discharged into the bag maker-packaging machine 20 for making a packaged product.

The articles, thus discharged from the combinational weighing apparatus 10 to be packaged and made into a product, are dropped together into a cylindrical tube 21 of the bag maker-packaging machine 20, which comprises a former 22 for bending a thermoplastic film F pulled out of a film roll R cylindrically around the tube 21 and a sealer 23 for sealing specified parts of the cylindrically formed film F further pulled down from the tube 21 and cutting it so as to form a bag W, enclosing the articles X dropped through the tube 21 into the bag W to produce a package G. The package G thus produced is dropped onto a chute 24 to be transported to the sorter 30.

The sorter 30 comprises a sorter conveyer 32 onto which each package G, discharged from the bag maker-packaging machine 20, is transported by a feeder conveyer 31. As shown more clearly in FIG. 2, two pairs of sorter arms 33a–33d are disposed, sandwiching the sorter conveyer 32 therebetween. Each sorter arm 33a–33d is adapted to swing around a shaft 34 sweepingly over the sorter conveyer 32 so as to change the trajectory of each incoming package G traveling along the arrow A into selected one of collection containers C1–C4. Those of the packages G for which none of the sorter arms 33a–33d was activated will continue to travel on the sorter conveyer and are collected in a fifth container C5 at the downstream end of the sorter conveyer 32. Thus, the articles X discharged from the combinational weighing apparatus 10 are sequentially made into packages by the bag maker-packaging machine 20 and then collected according to ranks by the sorter 30. For example, the articles X may be classified into ranks according to their weight such as small (S), medium (M), large (L), very large (LL) and others (unranked).

As shown in FIG. 3, the combinational weighing system 1 of this invention further comprises a control unit 40 for controlling the operations of the combinational weighing apparatus 10, the bag maker-packaging machine 20 and the sorter 30 on the basis of signals received from the combinational weighing apparatus 10 and the bag maker-packaging machine 20. The control carried out by the control unit 40 will be explained next with reference to the flow chart in FIGS. 4 and 5. In what follows, it will be assumed that the timing hopper 16 is already loaded with articles received from the selected weigh hoppers 14 in the previous cycle of combinational calculations and that each of the pool hoppers 13 and the weigh hoppers 14 therebelow contains each one of the articles.

When the control unit 40 receives a specified timing signal from the bag maker-packaging machine 20 (Step S1), the timing hopper 16 is opened and closed (Step S2) to discharge the articles therein which were selected in the previous cycle of combinational calculations. Next, the measured weights of the articles in the weigh hoppers 14 are inputted to the control unit 40 (Step S3), and these articles are each classified into one of the ranks such as S, M and L (Step S4) according to the weight.

Next, the most populated rank, that is, the rank into which a largest number of articles have been classified, is identified and combinational calculations are carried out on the weights of only those articles classified into that rank (Step S5). If at least one combination with the total weight falling within an allowable range specified for this rank is present (YES in Step S6), the weigh hoppers 14 in the combination with the total weight closest to a specified target value are opened and closed (Step 10) so as to discharge the articles therein.

After a signal indicative of the rank of the articles thus discharged is outputted to the bag maker-packaging machine 20 and the sorter 30 (Step S11), the pool hoppers 13 corresponding to those weigh hoppers 14 which have just discharged their contents and become empty are opened and closed (Step S12) and the radial feeders 12 corresponding to these pool hoppers 13 are activated such that one article each will be received by these pool hoppers 13 (Step S13).

If it is determined in Step S6 that no combination exists with the total weight within the specified allowable range (NO in Step 6), and if it is further determined that combinational calculations have not been carried out on all ranks yet (NO in Step 7), the second most populated rank, that is, the rank into which the next largest number of articles have been classified, is identified and combinational calculations are carried out on the weights of only those articles in that rank (Step S8) to find out whether there is a combination with the total weight within the allowable range specified for that rank (Step 9). If YES, the processes in Steps S10–S13 are carried out. If the answer is NO in Step 9, Steps S7–S9 are repeated until combinations are calculated in all ranks.

If combinations have been calculated in all ranks (YES in Step S7), it is determined whether any unranked product is present (Step S14) and, if there is, it is then determined whether any of the weigh hoppers 14 is empty (Step S15). If there is no empty weigh hopper, the weigh hopper containing the unranked product is opened and closed to discharge it (Step S16) and the processes in Steps S11–S13 are carried out.

If it is determined in Step S14 that there is no unranked product, it is determined whether products belonging to different ranks are allowed to be mixed (Step S17). If such mixing is allowed (YES in Step S17), combinational calculations are carried out without regard to ranks (Step S18). If a combination with the total weight within the allowable range specified for this kind of products is found (YES in Step S19), the processes in Steps S10–S13 are carried out. If there is none (NO in Step S19), the control unit 40 looks for articles of a sparsely populated rank, and causes some of these weigh hoppers 14 holding them to open and close (Step S20), thereby discharging their contents and thereafter carrying out Steps S11–S13.

If it is determined in Step 17 that mixing of articles of different ranks is not allowed (NO in Step S17), the processes of Steps S20 and S11–S13 are carried out.

With a system as described above, adapted to combine articles in the weigh hoppers 14, the probability of finding no combination with the total weight within a specified allowable range will increase if there are many ranks because the number of articles within the same rank which can be combined will accordingly decrease. As a countermeasure for such a situation, so-called booster hoppers may be provided below the weigh hoppers 14 in order to increase the number of combinations. Articles weighed in the weigh hoppers are temporarily stored in the booster hoppers such that combinational calculations can be carried out not only on the articles in the weigh hoppers but also those in the booster hoppers. If such booster hoppers are introduced, each weigh hopper is provided with discharge gates such that the article therein can be discharged selectively either into the associated booster hopper therebelow or directly into the collector chute 15.

With a system embodying this invention, articles supplied into the weigh hoppers 14 through the pool hoppers 13 are first classified into ranks according to their measured weights and then combinational calculations are carried out directly thereafter and only on those articles which are classified into the same rank. Thus, unlike the prior art technology, there is no need to take out the articles from the hoppers after they are classified into ranks and then to store them separately thereafter. Since combinational calculations are carried out with higher priority on articles in a more populated rank having more articles classified thereinto, there are more combinations to be calculated and a combination with the total weight within a specified range, or closer to the target weight, is likely to be found.

In the case of an only sparsely populated rank having only a small number of articles classified thereinto and where their articles are not selected by the combinational calculations, their probability of being selected increases as articles in that rank are likely to be supplied in the following cycles of operation. Although at times two or more articles may be found in a weigh hopper or there may be an empty weigh hopper, such "unranked articles" are discharged or a new article is supplied. Thus, there always will be a sufficient number of articles for the combinational calculations in the next cycle such that accurately measured packaged products can be obtained.

After articles or products are discharged in Step S10, S16 or S20 in the flow chart of FIGS. 4 and 5, the control unit 40 outputs a rank-indicating signal in the next step (Step S11) to the bag maker-packaging machine 20 and the sorter 30. When this signal is received, the bag maker-packaging machine 20 provides a film of an appropriate size, depending on the received signal. In the case of an unranked product, the length of the film to be pulled out may be conspicuously increased or the sealing process may be omitted such that the operator can easily distinguish an unranked product.

When a rank-indicating signal is received by the sorter 30, the sorter arms 33a–33d are accordingly activated so as to have the incoming package received by the right collection container C1–C5. The sorter arms 33a–33d are not activated in the case of an unranked product or article such that it will be received in the fifth container C5 at the downstream end of the sorter conveyer 32. If an external apparatus for detecting defective products or abnormal conditions is incorporated in the system, the control unit 40 may be programmed to output rank-indicating signals also to such external apparatus. Unranked articles and products to be collected in the fifth container C5 may be further classified into different categories and collected separately in different containers.

In summary, since rank-indicating signals are outputted from the control unit 40 to both the bag maker-packaging machine 20 and the sorter 30, causing them to function according to these signals, package-making and collection with sorting can be carried out smoothly and dependably in one continuous series of operations.

Although combinational calculations by weight according to ranks have been described, this is not intended to limit the scope of the invention. For example, combinational calculations may be carried out according to ranks and by number of articles. The control unit may be so programmed, for example, that packages with eight articles ranked M, packages with seven articles ranked L and packages with six articles ranked LL will be produced.

What is claimed is:

1. A method of combinational weighing by ranks, said method comprising the steps of:

supplying articles of different weights to a plurality of weighing devices, one at a time to each of said weighing devices;

measuring individual weights of said articles supplied to said weighing devices;

classifying said weighed articles individually into ranks according to measured weights thereof;

determining which of said ranks is the most populated, having the largest number of said weighed articles classified thereinto; and carrying out combinational weighing on only those of said weighed articles in selected one of said ranks.

2. The method of claim 1 wherein said combinational weighing is carried out with a higher priority on those of said weighed articles in a more populated rank.

3. The method of claim 1 further comprising the steps of:

determining whether there is an unranked article among said weighed articles which cannot be classified into any of said ranks;

determining whether any of said weighing devices is empty; and discharging, if it has been determined that there is an unranked article and that there is no weighing device which is empty, the weighing device holding said unranked article.

4. The method of claim 1 further comprising the steps of:

determining whether it is permitted to mix those of said articles classified into different ones of said ranks; and carrying out combinational weighing on all of said weighed articles without regard to said ranks if it has been determined that it is permitted to mix those of said articles classified into different ones of said ranks.

5. An apparatus for combinational weighing by ranks, said apparatus comprising:

a plurality of weighing devices for measuring weights;

article supplying means for supplying articles of different weights one at a time to each of said plurality of weighing devices;

classifying means for classifying articles weighed by said weighing devices into ranks according to measured weights thereof;

means for determining which of said ranks is the most populated, having the largest number of said weighed articles classified thereinto; and means for carrying out combinational calculations on the measured weights of only those of said articles in a same rank and selecting a combination with total weight within a specified allowable range.

6. The apparatus of claim 5 wherein said combinational weighing is carried out with a higher priority on those of said weighed articles in a more populated rank.

7. The apparatus of claim 5 further comprising means for:

determining whether there is an unranked article among said weighed articles which has not been classified into any of said ranks;

determining whether any of said weighing devices is empty; and discharging, if it has been determined that there is an unranked article and that there is no weighing device which is empty, the weighing device holding said unranked article.

8. The apparatus of claim 5 further comprising means for carrying out combinational weighing on all of said weighed articles without regard to said ranks if it has been determined that it is permitted to mix those of said articles classified into different ones of said ranks.

9. A system for combinational weighing by ranks, said system comprising:

a combinational weighing apparatus which includes:

a plurality of weighing devices for measuring weights;

article supplying means for supplying articles of different weights one at a time to each of said plurality of weighing devices;

classifying means for classifying articles weighed by said weighing devices into ranks according to measured weights thereof;

means for carrying out combinational calculations on the measured weights of only those of said articles in a same rank and selecting a combination with total weight within a specified allowable range; and discharge means for discharging together those of said articles in said combination which was selected;

a packaging machine for packaging the articles discharged by said discharge means to produce a packaged product;

a sorter for sorting said packaged product according to the rank of said packaged articles; and a control means for determining which of said ranks is the most populated and controlling operations of said packaging machine and said sorter according to the rank of said packaged articles.

10. The system of claim 9 wherein said combinational weighing is carried out with a higher priority on those of said weighed articles in a more populated rank.

11. The system of claim 11 wherein said control means serves to:

determine whether there is an unranked article among said weighed articles which has not been classified into any of said ranks;

determine whether any of said weighing devices is empty; and discharge, if it has been determined that there is an unranked article and that there is no weighing device which is empty, the weighing device holding said unranked article.

12. The system of claim 9 wherein said control means causes combinational weighing to be carried out on all of said weighed articles without regard to said ranks if it has been determined that it is permitted to mix those of said articles classified into different ones of said ranks.

13. The system of claim 9 wherein said packaging machine is adapted to use packaging materials of different sizes according to said same rank.

\* \* \* \* \*